US011862056B2

(12) United States Patent
Choi et al.

(10) Patent No.: US 11,862,056 B2
(45) Date of Patent: Jan. 2, 2024

(54) OPTICAL COMPENSATION SYSTEM, OPTICAL COMPENSATION METHOD, AND DISPLAY DEVICE BASED ON ARTIFICIAL INTELLIGENCE

(71) Applicant: LG Display Co., Ltd., Yeongdeungpo-gu (KR)

(72) Inventors: Dongjun Choi, Paju-si (KR); SungWoo Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/957,722

(22) Filed: Sep. 30, 2022

(65) Prior Publication Data

US 2023/0177987 A1 Jun. 8, 2023

(30) Foreign Application Priority Data

Dec. 2, 2021 (KR) ........................ 10-2021-0170715

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2320/0233* (2013.01); *G09G 2320/0276* (2013.01); *G09G 2320/0673* (2013.01); *G09G 2320/0693* (2013.01)

(58) Field of Classification Search
CPC ................. G09G 3/006; G09G 3/3233; G09G 2320/0233; G09G 2320/0276; G09G 2320/0673; G09G 2320/0693
See application file for complete search history.

(56) References Cited

U.S. PATENT DOCUMENTS

| | | | | |
|---|---|---|---|---|
| 2020/0243067 | A1* | 7/2020 | Maziewski | G06F 21/566 |
| 2020/0335042 | A1* | 10/2020 | Son | G09G 3/3291 |
| 2021/0225327 | A1* | 7/2021 | Matsumoto | G09G 5/10 |
| 2021/0280111 | A1* | 9/2021 | Chung | G09G 3/2092 |
| 2022/0130346 | A1* | 4/2022 | Hong | G09G 5/10 |
| 2022/0334520 | A1* | 10/2022 | Nishi | G03G 15/2028 |

* cited by examiner

*Primary Examiner* — Premal R Patel
(74) *Attorney, Agent, or Firm* — Seed IP Law Group LLP

(57) ABSTRACT

An optical compensation system based on artificial intelligence according to embodiments of the present disclosure may include a measuring device configured to measure optical characteristics of a display panel, and output measurement result data of the optical characteristics, and an artificial intelligence-based optical compensation controller configured to predict and generate optical compensation result data corresponding to the measurement result data of the optical characteristics based on an artificial intelligence neural network using previous optical compensation result data for at least one other display panel, and store the predicted and generated optical compensation result data in a memory corresponding to the display panel.

17 Claims, 8 Drawing Sheets

OPTICAL COMPENSATION SYSTEM, OPTICAL COMPENSATION METHOD, AND DISPLAY DEVICE BASED ON ARTIFICIAL INTELLIGENCE

CROSS REFERENCE TO RELATED APPLICATION

This application claims the benefit of and priority to Korean Patent Application No. 10-2021-0170715, filed on Dec. 2, 2021, in the Korean Intellectual Property Office, which is herein incorporated by reference in its entirety.

BACKGROUND

Technical Field

The present disclosure relates to optical compensation systems, optical compensation methods, and display devices that utilize artificial intelligence.

Description of the Related Art

Self-luminous display devices, such as organic light-emitting display devices, use light-emitting elements that emit light by themselves, and thus the self-luminous display devices are in the spotlight because of advantages such as quick response time, high luminous efficiency, high luminance, and a wide viewing angle.

BRIEF SUMMARY

With a self-luminous display device, such as an organic light-emitting display device, due to various causes in a process, different optical characteristics may occur for each display panel, and accordingly, even when the same voltage or current is applied to multiple display panels of the same model, the color coordinates or luminance of an image implemented for each display panel may vary.

In the field of existing display technology, there has been a problem that image quality is deteriorated due to a deviation of optical characteristics for each self-luminous display panel, such as an organic light-emitting display panel, and in order to solve this problem, various optical compensation technologies have been proposed, but there is a problem that the optical compensation performance is not sufficient or the optical compensation processing time is very long. Accordingly, the present specification describes technical improvements including an optical compensation system, an optical compensation method, and a display device based on artificial intelligence as accurate and fast optical compensation technology.

One or more embodiments of the present disclosure may provide an optical compensation system, an optical compensation method, and a display device based on artificial intelligence as accurate and fast optical compensation technology.

One or more embodiments of the present disclosure may provide an optical compensation system, an optical compensation method, and a display device based on artificial intelligence that can also perform display driving by predicting a data voltage optimized for optical characteristics of a display panel.

One or more embodiments of the present disclosure may provide an optical compensation system and an optical compensation method based on artificial intelligence capable of actively and quickly responding to characteristics and condition changes of each display panel, and a display device to which artificial intelligence-based optical compensation is applied.

One or more embodiments of the present disclosure may provide an optical compensation system based on artificial intelligence including: a measuring device configured to measure optical characteristics of a display panel, and output measurement result data of the optical characteristics; and an artificial intelligence-based optical compensation controller configured to predict and generate optical compensation result data corresponding to the measurement result data of the optical characteristics based on an artificial intelligence neural network using previous optical compensation result data for at least one other display panel, and store the predicted and generated optical compensation result data in a memory corresponding to the display panel.

One or more embodiments of the present disclosure may provide an optical compensation method based on artificial intelligence including operations of: measuring optical characteristics of a display panel through a measuring device and generating measurement result data of the optical characteristics; executing an artificial intelligence process based on an artificial intelligence neural network using previous optical compensation result data for at least one other display panel; predicting and generating a data voltage for each band or gradation as optical compensation result data corresponding to the measurement result data of the optical characteristics according to a result of executing the artificial intelligence process; and storing information on the predicted and generated data voltage in a memory corresponding to the display panel.

One or more embodiments of the present disclosure may provide a display device including: a display panel including a data line; a memory configured to store information on a data voltage for each band or gradation; and a data driving circuit configured to output a data voltage corresponding to a current band or a current gradation among the data voltages for each band or gradation to the data line.

In the display device according to some embodiments of the present disclosure, the information on the data voltage for each band or gradation stored in the memory may be information predicted and generated as optical compensation result data corresponding to measurement result data of optical characteristics of the display panel according to a result of executing an artificial intelligence process based on an artificial intelligence neural network, and stored in the memory.

According to some embodiments of the present disclosure, it is possible to provide an optical compensation system, an optical compensation method, and a display device based on artificial intelligence as accurate and fast optical compensation technology.

According to some embodiments of the present disclosure, it is possible to provide an optical compensation system, an optical compensation method, and a display device based on artificial intelligence that can also perform display driving by predicting a data voltage optimized for optical characteristics of a display panel.

According to some embodiments of the present disclosure, it is possible to provide an optical compensation system and an optical compensation method based on artificial intelligence capable of actively and quickly responding to characteristic and condition changes of each display panel, and a display device to which artificial intelligence-based optical compensation is applied.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
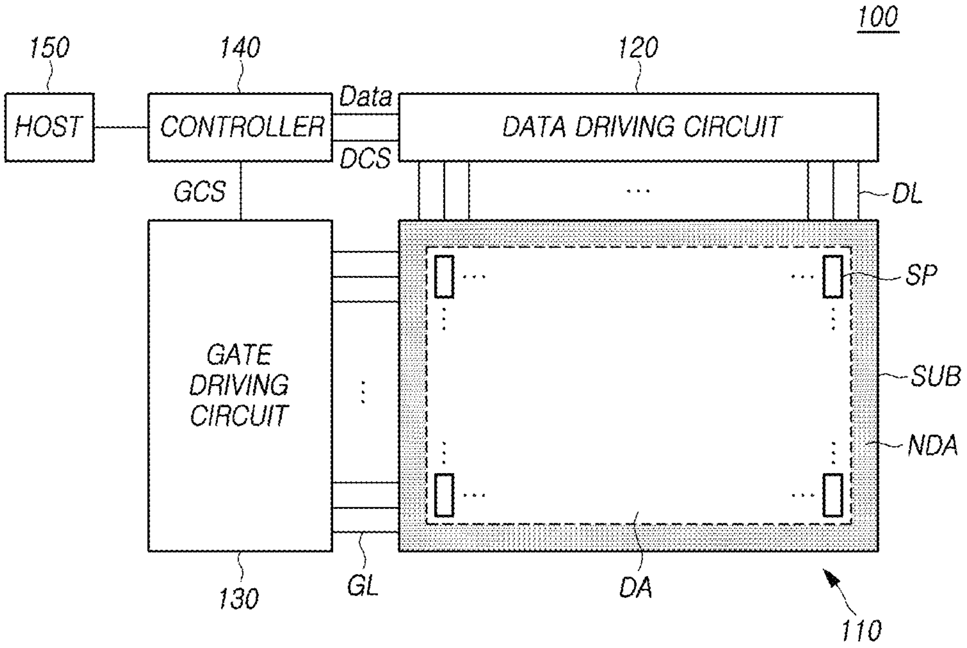
FIG. 1 is a system configuration diagram of a display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Furthermore, in the following description of the present disclosure, a detailed description of known functions and configurations incorporated herein will be omitted when it may make the subject matter of the present disclosure rather unclear. In a case in which terms “include,” “have,” “comprise,” and the like described in the present specification are used, another part may be added unless a more limiting term, such as “only,” is used. The terms of a singular form may include plural forms unless referred to the contrary.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In the case that it is described that a certain structural element “is connected to,” “is coupled to,” “is in contact with” another structural element, or the like, it should be interpreted that another structural element may “be connected to,” “be coupled to,” or “be in contact with” the structural elements as well as that the certain structural element is directly connected to or is in direct contact with another structural element. Here, other components may be included in one or more of two or more components that are “connected,” “coupled” or “connected” to each other.

In description of a time relationship related to components, an operation method, a production method, etc., for example, when a temporal order or a flow order is described as “after,” “subsequent,” “next,” “before,” etc., an instance which is not continuous may be included unless “immediate” or “direct” are used.

Meanwhile, when a numerical value or corresponding information (e.g., level, etc.) for a component are mentioned, even though there is no explicit description separately, the numerical value or the corresponding information may be interpreted as including an error range that may be caused by various factors.

Hereinafter, various embodiments of the present disclosure will be described in detail with reference to the accompanying drawings.

FIG. 1 is a system configuration diagram of a display device 100 according to embodiments of the present disclosure.

Referring to FIG. 1, a display driving system of the display device 100 according to embodiments of the present disclosure may include a display panel 110 and a driving (120, 130) circuit for driving the display panel 110.

The display panel 110 may include a display area DA in which an image is displayed and a non-display area NDA in which an image is not displayed. The display panel 110 may include a plurality of sub-pixels SP disposed on a substrate SUB for image display. For example, the plurality of sub-pixels SP may be disposed in the display area DA. In some cases, at least one sub-pixel SP may be disposed in the non-display area NDA. At least one sub-pixel SP disposed in the non-display area NDA is also referred to as a dummy sub-pixel.

The display panel 110 may include a plurality of signal lines disposed on the substrate SUB for driving the plurality of sub-pixels SP. For example, the plurality of signal lines may include a plurality of data lines DL and a plurality of gate lines GL. The signal lines may further include signal lines other than the plurality of data lines DL and the plurality of gate lines GL according to a structure of the sub-pixel SP. For example, the other signal lines may include driving voltage lines, reference voltage lines, and the like.

The plurality of data lines DL and the plurality of gate lines GL may cross each other. Each of the plurality of data lines DL may be disposed to extend in a first direction. Each of the plurality of gate lines GL may be disposed to extend in a second direction. Here, the first direction may be a column direction and the second direction may be a row direction. In this specification, the column direction and the row direction are relative. For example, the column direction may be a vertical direction and the row direction may be a horizontal direction. As another example, the column direction may be the horizontal direction and the row direction may be the vertical direction. Hereinafter, for convenience of description, it is assumed that each data line DL is disposed to extend in the vertical direction, and each gate line GL is disposed to extend in the horizontal direction.

The driving circuit may include a data driving circuit 120 for driving the plurality of data lines DL and a gate driving circuit 130 for driving the plurality of gate lines GL. The driving circuit may further include a controller 140 for controlling the data driving circuit 120 and the gate driving circuit 130.

The data driving circuit 120 may be a circuit for driving the plurality of data lines DL and may output data signals (also referred to as data voltages) corresponding to an image signal to the plurality of data lines DL. The gate driving circuit 130 may be a circuit for driving the plurality of gate lines GL and may generate gate signals to output the gate signals to the plurality of gate lines GL.

The controller 140 may start a scan according to a timing implemented in each frame and control data driving at an appropriate time according to the scan. The controller 140 may convert input image data input from the outside so as to match a data signal format used in the data driving circuit 120 and supply the converted image data to the data driving circuit 120.

The controller 140 may receive display driving control signals from an external host system 150 together with the input image data. For example, the display driving control signals may include a vertical synchronization signal (VSYNC), a horizontal synchronization signal (HSYNC), an input data enable signal (DE), a clock signal, and the like.

The controller 140 may generate data driving control signals DCS and gate driving control signals GCS based on the display driving control signals input from the host system 150. The controller 140 may control a driving operation and a driving timing of the data driving circuit 120 by supplying the data driving control signals DCS to the data driving circuit 120. The controller 140 may control a driving operation and a driving timing of the gate driving circuit 130 by supplying the gate driving control signals GCS to the gate driving circuit 130.

The data driving circuit 120 may include one or more source driver integrated circuits (SDICs). Each source driver integrated circuit (SDIC) may include a shift register, a latch circuit, a digital to analog converter (DAC), an output buffer, and the like. Each source driver integrated circuit (SDIC) may further include an analog to digital converter (ADC) in some cases.

For example, each source driver integrated circuit (SDIC) may be connected to the display panel 110 by a tape automated bonding (TAB) method, may be connected to a bonding pad of the display panel 110 by a chip on glass (COG) or chip on panel (COP) method, or may be implemented in a chip on film (COF) method and connected to the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying the gate signal of the turn-on level voltage to the plurality of gate lines GL.

The gate driving circuit 130 may be connected to the display panel 110 by a tape automated bonding (TAB) method, may be connected to the bonding pad of the display panel 110 by a chip on glass (COG) method or a chip on panel (COP) method, or may be connected to the display panel 110 by a chip on film (COF) method. Alternatively, the gate driving circuit 130 may be formed in the non-display area NDA of the display panel 110 as a gate in panel (GIP) type. The gate driving circuit 130 may be disposed on or connected to the substrate. That is, the gate driving circuit 130 may be disposed in the non-display area NDA of the substrate in a case of the GIP type. The gate driving circuit 130 may be connected to the substrate in cases of the chip on glass (COG) type, the chip on film (COF) type, or the like.

Meanwhile, at least one driving circuit of the data driving circuit 120 and the gate driving circuit 130 may be disposed in the display area DA. For example, at least one driving circuit of the data driving circuit 120 and the gate driving circuit 130 may be disposed so as not to overlap the sub-pixels SP, and some or all of the driving circuits may be disposed so as to overlap the sub-pixels SP.

The data driving circuit 120 may be connected to one side (e.g., an upper side or a lower side) of the display panel 110. Depending on a driving method, a panel design method, etc., the data driving circuit 120 may be connected to both sides (e.g., the upper and lower sides) of the display panel 110 or may be connected to two or more of four sides of the display panel 110.

The gate driving circuit 130 may be connected to one side (e.g., a left side or a right side) of the display panel 110. Depending on a driving method, a panel design method, etc., the gate driving circuit 130 may be connected to both sides (e.g., the left and right sides) of the display panel 110 or may be connected to two or more of four sides of the display panel 110.

The controller 140 may be implemented as a separate component from the data driving circuit 120, or may be implemented as an integrated circuit by being integrated with the data driving circuit 120. The controller 140 may be a timing controller used in a conventional display technology, a control device capable of further performing other control functions including the timing controller, a control device different from the timing controller, or a circuit in the control device. The controller 140 may be implemented as various circuits or electronic components such as an integrated circuit (IC), a field programmable gate array (FPGA), an application specific integrated circuit (ASIC), or a processor.

The controller 140 may be mounted on a printed circuit board, a flexible printed circuit, or the like and may be electrically connected to the data driving circuit 120 and the gate driving circuit 130 through the printed circuit board, the flexible printed circuit, or the like. The controller 140 may transmit and receive signals to and from the data driving circuit 120 according to one or more predetermined interfaces. Here, for example, the interface may include a low voltage differential signaling (LVDS) interface, an EPI interface, a serial peripheral interface (SP), and the like.

The display device 100 according to embodiments of the present disclosure may be a self-luminous display device in which the display panel 110 emits light by itself. When the display device 100 according to embodiments of the present disclosure is the self-luminous display device, each of the plurality of sub-pixels SP may include a light-emitting element. For example, the display device 100 according to embodiments of the present disclosure may be an organic light-emitting display device in which the light-emitting element is implemented as an organic light-emitting diode (OLED). For another example, the display device 100 according to embodiments of the present disclosure may be an inorganic light-emitting display device in which the light-emitting element is implemented as an inorganic material-based light-emitting diode. For still another example, the display device 100 according to embodiments of the present disclosure may be a quantum dot display device in which the light-emitting element is implemented as a quantum dot which is a semiconductor crystal that emits light by itself.

Figure 2:
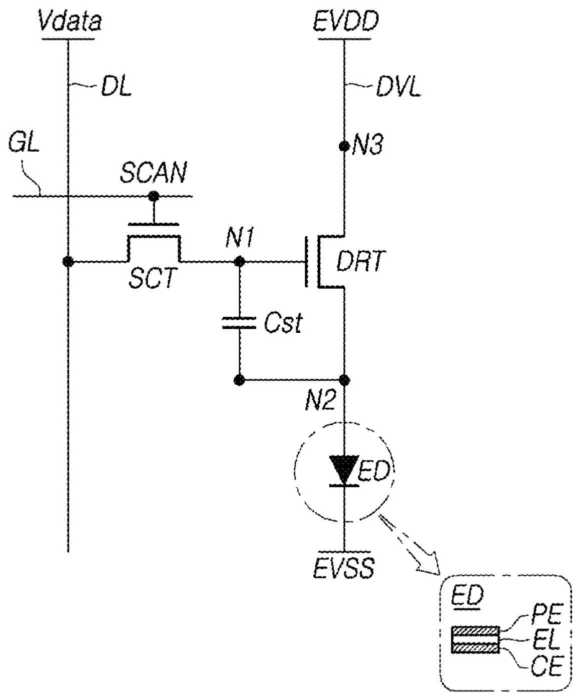
FIG. 2 is an equivalent circuit of a sub-pixel in a display panel according to embodiments of the present disclosure.
Figure 3:
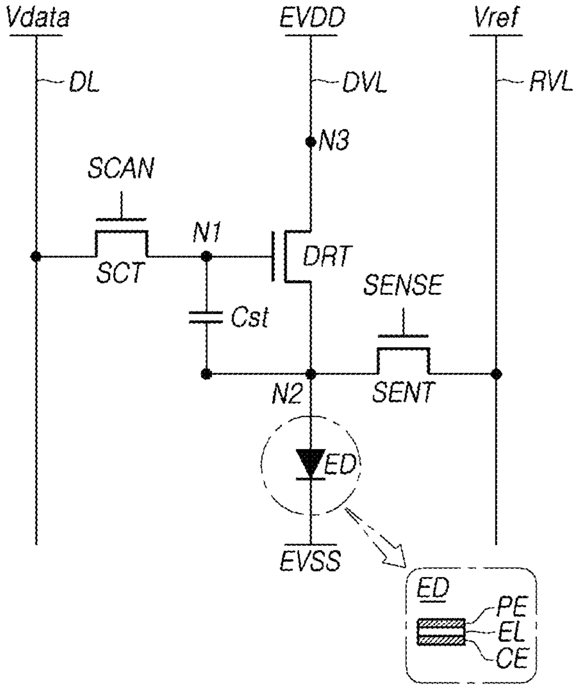
FIG. 3 is another equivalent circuit for a sub-pixel in a display panel according to embodiments of the present disclosure.

FIG. 2 shows an equivalent circuit of the sub-pixel SP in the display panel 110 according to embodiments of the present disclosure, and FIG. 3 shows another equivalent circuit of the sub-pixel SP in the display panel 110 according to embodiments of the present disclosure.

Referring to FIG. 2, in the display device 100 according to embodiments of the present disclosure, each sub-pixel SP may include a light-emitting element ED, a driving transistor DRT for driving the light-emitting element ED by controlling a current flowing to the light-emitting element ED, a scan transistor SCT for transmitting a data voltage Vdata to a first node N1 that is a gate node of the driving transistor DRT, and a storage capacitor Cst for maintaining a voltage for a certain period.

The light-emitting element ED may include a pixel electrode PE, a common electrode CE, and an emission layer EL positioned between the pixel electrode PE and the common electrode CE. The pixel electrode PE of the light-emitting element ED may be an anode or a cathode. The common electrode CE may be the cathode or the anode. The light-emitting element ED may be, for example, an organic light-emitting diode (OLED), an inorganic material-based light-emitting diode (LED), a quantum dot light-emitting element, or the like.

A base voltage EVSS may be applied to the common electrode CE of the light-emitting element ED. Here, the base voltage EVSS may be, for example, a ground voltage or a voltage similar to the ground voltage.

The driving transistor DRT may be a transistor for driving the light-emitting element ED and may include the first node N1, a second node N2, and a third node N3.

The first node N1 of the driving transistor DRT may be a node corresponding to a gate node and may be electrically connected to a source node or a drain node of the scan transistor SCT. The second node N2 of the driving transistor DRT may be the source node or the drain node and may be electrically connected to the pixel electrode PE of the light-emitting element ED. The third node N3 of the driving transistor DRT may be the drain node or the source node and may be electrically connected to a driving voltage line DVL supplying a driving voltage EVDD. Hereinafter, for convenience of description, it is possible to describe as an example that the second node N2 of the driving transistor DRT is the source node and the third node N3 is the drain node.

The scan transistor SCT may switch a connection between the data line DL and the first node N1 of the driving transistor DRT.

In response to a scan signal SCAN supplied from the gate line GL, the scan transistor SCT may control the connection between the first node N1 of the driving transistor DRT and a corresponding data line DL of the plurality of data lines DL.

The drain node or the source node of the scan transistor SCT may be electrically connected to the corresponding data line DL. The source node or the drain node of the scan transistor SCT may be electrically connected to the first node N1 of the driving transistor DRT. A gate node of the scan transistor SCT may be electrically connected to the gate line GL to receive the scan signal SCAN.

The scan transistor SCT may be turned on by the scan signal SCAN of a turn-on level voltage to transmit the data voltage Vdata supplied from the corresponding data line DL to the first node N1 of the driving transistor DRT.

The scan transistor SCT is turned on by the scan signal SCAN of the turn-on level voltage and is turned off by the scan signal SCAN of a turn-off level voltage. Here, when the scan transistor SCT is an n-type transistor, the turn-on level voltage may be a high level voltage, and the turn-off level voltage may be a low level voltage. When the scan transistor SCT is a p-type transistor, the turn-on level voltage may be a low level voltage and the turn-off level voltage may be a high level voltage.

The storage capacitor Cst may be electrically connected between the first node N1 and the second node N2 of the driving transistor DRT to maintain a data voltage Vdata corresponding to an image signal voltage or a voltage corresponding thereto for one frame time.

The storage capacitor Cst may not be a parasitic capacitor (e.g., Cgs or Cgd) that is an internal capacitor existing between the first node N1 and the second node N2 of the driving transistor DRT but may be an external capacitor intentionally designed outside the driving transistor DRT.

Since the sub-pixel SP illustrated in FIG. 2 has two transistors DRT and SCT and one capacitor Cst in order to drive the light-emitting element ED, the sub-pixel SP is said to have a 2T (transistor) 1C (capacitor) structure.

Referring to FIG. 3, in the display device 100 according to embodiments of the present disclosure, each sub-pixel SP may further include a sensing transistor SENT for an initialization operation and a sensing operation.

In this case, since the sub-pixel SP illustrated in FIG. 3 has three transistors DRT, SCT, and SENT and one capacitor Cst to drive the light-emitting element ED, the sub-pixel SP is said to have a 3T(transistor)1C (capacitor) structure.

The sensing transistor SENT may switch a connection between the second node N2 of the driving transistor DRT and a reference voltage line RVL.

The sensing transistor SENT may control the connection between the second node N2 of the driving transistor DRT electrically connected to the pixel electrode PE of the light-emitting element ED and a corresponding reference voltage line RVL among the plurality of reference voltage lines RVL in response to a sensing signal SENSE.

A drain node or a source node of the sensing transistor SENT may be electrically connected to the reference voltage line RVL. The source node or the drain node of the sensing transistor SENT may be electrically connected to the second node N2 of the driving transistor DRT and may be electrically connected to the pixel electrode PE of the light-emitting element ED. A gate node of the sensing transistor SENT may receive the sensing signal SENSE.

The sensing transistor SENT may be turned on to apply a reference voltage Vref supplied from the reference voltage line RVL to the second node N2 of the driving transistor DRT.

The sensing transistor SENT is turned on by the sensing signal SENSE of a turn-on level voltage and is turned off by the sensing signal SENSE of a turn-off level voltage. Here, when the sensing transistor SENT is an n-type transistor, the turn-on level voltage may be a high level voltage, and the turn-off level voltage may be a low level voltage. When the sensing transistor SENT is a p-type transistor, the turn-on level voltage may be a low level voltage and the turn-off level voltage may be a high level voltage.

Each of the driving transistor DRT, the scan transistor SCT, and the sensing transistor SENT may be an n-type transistor or a p-type transistor. All of the driving transistor DRT, the scan transistor SCT, and the sensing transistor SENT may be n-type transistors or p-type transistors. At least one of the driving transistor DRT, the scan transistor SCT, and the sensing transistor SENT may be an n-type transistor (or a p-type transistor), and the other may be a p-type transistor (or an n-type transistor).

The gate node of each of the scan transistor SCT and the sensing transistor SENT may be connected to the same single gate line GL. Alternatively, the gate node of each of the scan transistor SCT and the sensing transistor SENT may be connected to different gate lines GL.

The reference voltage line RVL may be disposed for one sub-pixel column. Alternatively, the reference voltage line RVL may be disposed for two or more sub-pixel columns. When the reference voltage line RVL is disposed for two or more sub-pixel columns, the plurality of sub-pixels SP may receive the reference voltage Vref from one reference voltage line RVL. For example, one reference voltage line RVL may be disposed for four sub-pixel columns. That is, one reference voltage line RVL may be shared by the sub-pixels SP included in the four sub-pixel columns.

The driving voltage line DVL may be disposed for one sub-pixel column. Alternatively, the driving voltage line DVL may be disposed for two or more sub-pixel columns. When the driving voltage line DVL is disposed for two or more sub-pixel columns, the plurality of sub-pixels SP may receive the driving voltage EVDD from one driving voltage line DVL. For example, one driving voltage line DVL may be disposed for four sub-pixel columns. That is, one driving voltage line DVL may be shared by the sub-pixels SP included in the four sub-pixel columns.

The 3T1C structure of the sub-pixel SP illustrated in FIG. 3 is merely an example for description and may further include one or more transistors, or in some cases, one or more capacitors. Alternatively, each of the plurality of sub-pixels may have the same structure, and some of the plurality of sub-pixels may have a different structure.

Meanwhile, the display device 100 according to embodiments of the present disclosure may have a top emission structure or a bottom emission structure.

Meanwhile, when the display device 100 according to embodiments of the present disclosure is a self-luminous display device such as an organic light-emitting display device, due to various causes in a process, the display device 100 may have optical characteristics different from actually desired optical characteristics (e.g., luminance, color coordinates, and the like), and thus have color coordinates or luminance different from the desired color coordinates or luminance of an image.

Accordingly, some embodiments of the present disclosure may provide an optical compensation system and an optical compensation method based on artificial intelligence that can also perform display driving by predicting a data voltage optimized for optical characteristics (e.g., luminance, and the like) of the display panel 110 and it is possible to provide an optical compensation method, and a display device to which the artificial intelligence-based optical compensation is applied.

In consideration of the optical characteristics (e.g., luminance, color coordinates, and the like) of the display panel 110, an optical compensation system and an optical compensation method based on artificial intelligence as a more accurate and faster optical compensation technology, and a display device to which the artificial intelligence-based optical compensation is applied will be described in more detail.

Figure 4:
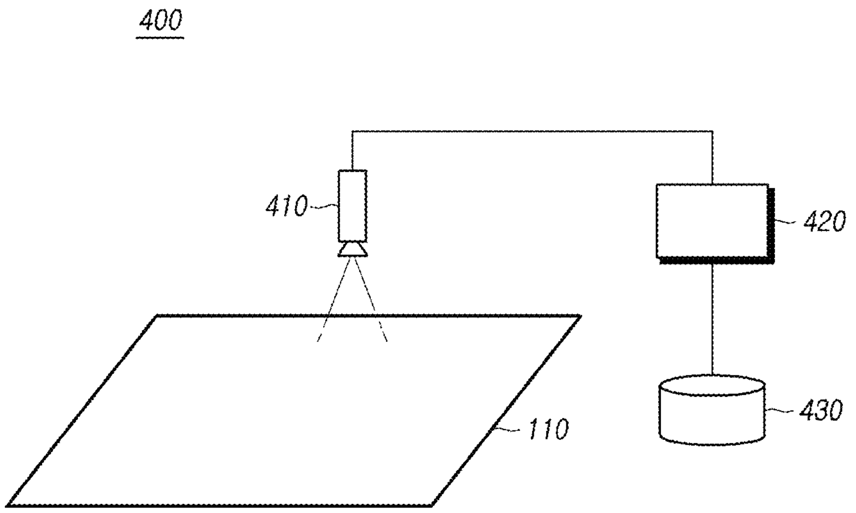
FIG. 4 is a view illustrating an optical compensation system based on artificial intelligence according to embodiments of the present disclosure.

FIG. 4 shows an optical compensation system 400 based on artificial intelligence according to embodiments of the present disclosure.

Referring to FIG. 4, the optical compensation system 400 based on artificial intelligence according to embodiments of the present disclosure is a system that performs optical compensation using artificial intelligence, and the optical compensation system 400 may include a measuring device 410 and an artificial intelligence-based optical compensation controller 420.

The measuring device 410 may measure the optical characteristics of the display panel 110 to output measurement result data of the optical characteristics. For example, the measuring device 410 may include a luminance meter or the like.

The artificial intelligence-based optical compensation controller 420 may predict and generate optical compensation result data corresponding to the measurement result data of the optical characteristics based on an artificial intelligence neural network using previous optical compensation result data for at least one other display panel.

The artificial intelligence-based optical compensation controller 420 may predict current optical compensation result data using all of the previous optical compensation result data for at least one other display panel, which is a sample for which artificial intelligence-based optical compensation has already been completed and using the artificial intelligence neural network.

The artificial intelligence-based optical compensation controller 420 may store the optical compensation result data generated by predicting using artificial intelligence in a memory 430 corresponding to the display panel 110.

For example, the optical compensation result data predicted and generated by the artificial intelligence-based optical compensation controller 420, may include information on the data voltage predicted for each desired target.

For example, the desired target may include a desired band, luminance, or color coordinates. Here, the band is also referred to as a luminance mode (brightness mode), and the luminance (brightness) of the display panel 110 may be controlled in one of various bands.

For example, the previous optical compensation result data for at least one other display panel may be data obtained through a result of a previous optical compensation process completed for at least one other display panel, and may include information such as a data voltage, a gamma voltage, and the like.

The artificial intelligence-based optical compensation controller 420 may generate machine learning result data by performing machine learning (ML) using the previous optical compensation result data for at least one other display panel that is a sample for which artificial intelligence-based optical compensation has already been completed.

The artificial intelligence-based optical compensation controller 420 may predict and generate the optical compensation result data corresponding to the measurement result data of the optical characteristics based on the artificial intelligence neural network using the machine learning result data and the measurement result data of the optical characteristics.

The artificial intelligence-based optical compensation controller 420 may execute a log file collecting process collecting a log file that is big data using the previous optical compensation result data for the at least one other display panel, execute a data processing process that selects learning data for machine learning from the collected log files, and perform machine learning based on the selected learning data to generate the machine learning result data.

The artificial intelligence-based optical compensation controller 420 may perform a preprocessing to optimize and set a driving voltage by controlling so as to primarily measure the optical characteristics of the display panel 110 through the measuring device 410 before measuring (main measurement) the optical characteristics of the display panel 110 for obtaining the measurement result data of the optical characteristics through the measuring device 410.

The driving voltage may be a voltage used when the display panel 110 is driven while the optical characteristics of the display panel 110 are measured (main measurement) through the measuring device 410.

For example, the driving voltage may include the base voltage EVSS or a black data voltage supplied to the sub-pixels SP included in the display panel 110, or may include a luminance weight for each region in the display panel 110.

Figure 5:
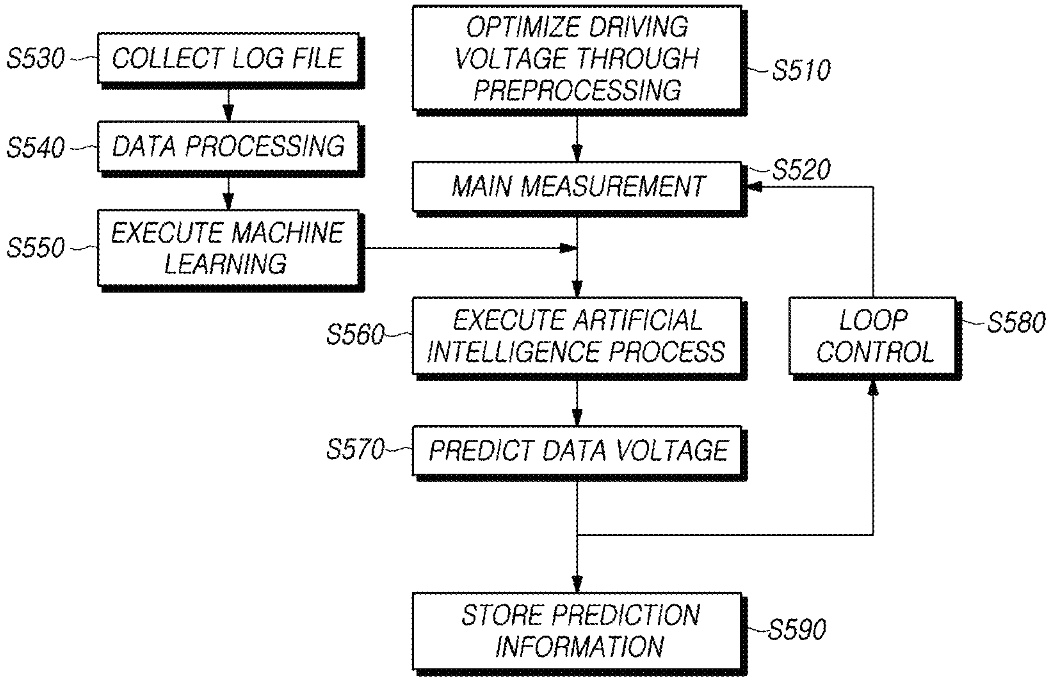
FIG. 5 is a flowchart of an optical compensation method based on artificial intelligence according to embodiments of the present disclosure.

FIG. 5 is a flowchart of an optical compensation method based on artificial intelligence according to embodiments of the present disclosure.

Referring to FIG. 5, the optical compensation system 400 based on artificial intelligence according to embodiments of the present disclosure may perform an optical compensation method based on artificial intelligence.

Referring to FIG. 5, the optical compensation method based on artificial intelligence according to embodiments of the present disclosure may include a main measurement operation (S520), an artificial intelligence process execution operation (S560), a data voltage prediction operation (S570), a prediction information storage operation (S590), and the like.

In the main measurement operation (S520), the artificial intelligence-based optical compensation controller 420 of the optical compensation system 400 based on artificial intelligence may measure the optical characteristics of the display panel 110 through the measuring device 410 to generate the measurement result data of the optical characteristics.

In the artificial intelligence process execution operation (S560), the artificial intelligence-based optical compensation controller 420 of the optical compensation system 400 based on artificial intelligence may execute an artificial intelligence process based on the artificial intelligence neural network using the previous optical compensation result data for at least one other display panel.

In the data voltage prediction operation (S570), the artificial intelligence-based optical compensation controller 420 of the optical compensation system 400 based on artificial intelligence may predict and generate a data voltage for each band or gradation as the optical compensation result data corresponding to the measurement result data of the optical characteristics according to the result of executing the artificial intelligence process.

In the prediction information storage operation (S590), the artificial intelligence-based optical compensation controller 420 of the optical compensation system 400 based on artificial intelligence may store information on the data voltage generated by prediction in the data voltage prediction operation (S570) in the memory 430 corresponding to the display panel 110.

Referring to FIG. 5, the optical compensation method based on artificial intelligence according to embodiments of the present disclosure may further include a machine learning progress operation (S550) of generating the machine learning result data by performing machine learning using the previous optical compensation result data for at least one other display panel by the artificial intelligence-based optical compensation controller 420 of the optical compensation system 400 based on artificial intelligence before the operation of executing the artificial intelligence process (S560).

In the operation of executing the artificial intelligence process (S560), the artificial intelligence-based optical compensation controller 420 of the optical compensation system 400 based on artificial intelligence may predict and generate the optical compensation result data corresponding to the measurement result data of the optical characteristics based on the machine learning result data and the measurement result data of the optical characteristics.

Referring to FIG. 5, the optical compensation method based on artificial intelligence the according to embodiments of the present disclosure may further include a log file collecting operation (S530) in which the artificial intelligence-based optical compensation controller 420 of the optical compensation system 400 collects a log file that is big data using the previous optical compensation result data for at least one other display panel before the machine learning performing operation (S550).

Referring to FIG. 5, the optical compensation method based on artificial intelligence according to embodiments of the present disclosure may further include a data processing operation (S540) in which the artificial intelligence-based optical compensation controller 420 of the optical compensation system 400 selects learning data for machine learning from the collected log files after the log file collecting operation (S530).

Referring to FIG. 5, the optical compensation method based on artificial intelligence according to embodiments of the present disclosure may further include a preprocessing operation (S510) in which the artificial intelligence-based optical compensation controller 420 of the optical compensation system 400 sets a driving voltage by controlling so as to primarily measure the optical characteristics of the display panel 110 through the measuring device 410 before the operation of generating the measurement result data of the optical characteristics (S520).

Referring to FIG. 5, the optical compensation method based on artificial intelligence according to embodiments of the present disclosure may further include a loop control operation (S580) in which the intelligence-based optical compensation controller 420 of the optical compensation system 400 based on artificial intelligence changes a band and a point after the operation of predicting and generating the data voltage (S570)

After the loop control operation (S580), the artificial intelligence-based optical compensation controller 420 of the optical compensation system 400 based on artificial intelligence may repeatedly execute the operation of generating the measurement result data of the optical characteristics (S520), the operation of executing the artificial intelligence process (S560), and the operation of predicting and generating the data voltage (S570).

Figure 6:
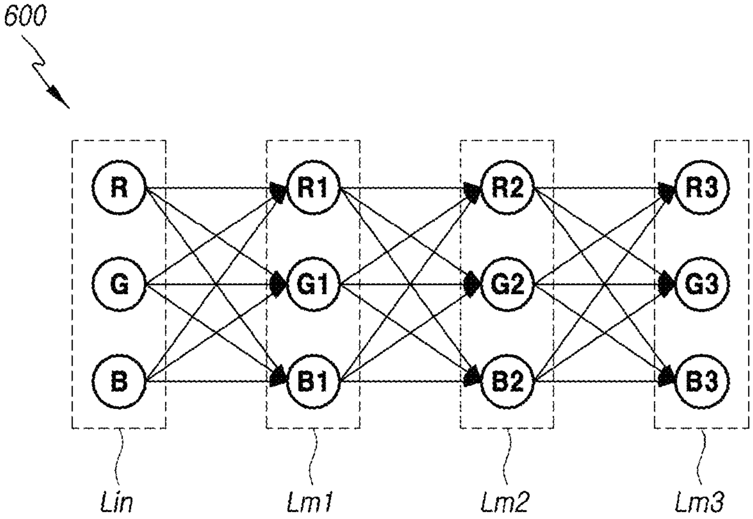
FIG. 6 is a view illustrating an affine layer neural network for artificial intelligence-based optical compensation according to embodiments of the present disclosure.

FIG. 6 shows an affine layer neural network 600 as an artificial intelligence neural network for artificial intelligence-based optical compensation according to embodiments of the present disclosure.

Referring to FIG. 6, for example, the artificial intelligence neural network for artificial intelligence-based optical compensation may be the affine layer neural network 600.

Referring to FIG. 6, the affine layer neural network 600 may include an input layer Lin including a plurality of input nodes R, G, and B corresponding to processing information of a first preprocessing, a first intermediate layer Lm1 including a plurality of first intermediate nodes R1, G1, and B1 corresponding to processing information of a second preprocessing, a second intermediate layer Lm2 including a plurality of second intermediate nodes R2, G2, and B2 corresponding to processing information of a third preprocessing, and an output layer Lout including a plurality of output nodes R3, G3, and B3 corresponding to processing information of a main processing.

The plurality of input nodes R, G, and B may be connected to all or some of the plurality of first intermediate nodes R1, G1, and B1, the plurality of first intermediate nodes R1, G1, and B1 may be connected to all or some of the plurality of second intermediate nodes R2, G2, and B2, and the plurality of second intermediate nodes R2, G2, and B2 may be connected to all or some of the plurality of output nodes R3, G3, and B3. For example, the plurality of input nodes R, G, and B, the plurality of first intermediate nodes R1, G1, and B1, the plurality of second intermediate nodes R2, G2, and B2, and the plurality of output nodes R3, G3, and B3 may correspond to a red image signal (red data), a green image signal (green data), and a blue image signal (blue data).

Referring to FIG. 6, in relation to the affine layer neural network 600, the first preprocessing may be a pre-optical compensation processing for each color coordinate or luminance, the second preprocessing may be a pre-optical compensation processing for each color using a first luminance value, the third preprocessing may be a pre-optical compensation processing for each color using a second luminance value higher than the first luminance value, and the main processing may be a processing for obtaining the measurement result data of the optical characteristics.

Alternatively, in relation to the affine layer neural network 600, the main processing may correspond to an optical compensation processing, and the processing information of the main processing may correspond to optical compensation result data. The second preprocessing and the third preprocessing may be substantially the same processing as the optical compensation processing or may be a pre-optical compensation processing performed before the optical compensation processing. An optimization of the driving voltage may be performed through the second preprocessing and/or the third preprocessing.

The artificial intelligence-based optical compensation controller 420 of the optical compensation system 400 based on artificial intelligence may update the artificial intelligence neural network based on the predicted and generated optical compensation result data.

Figure 7:
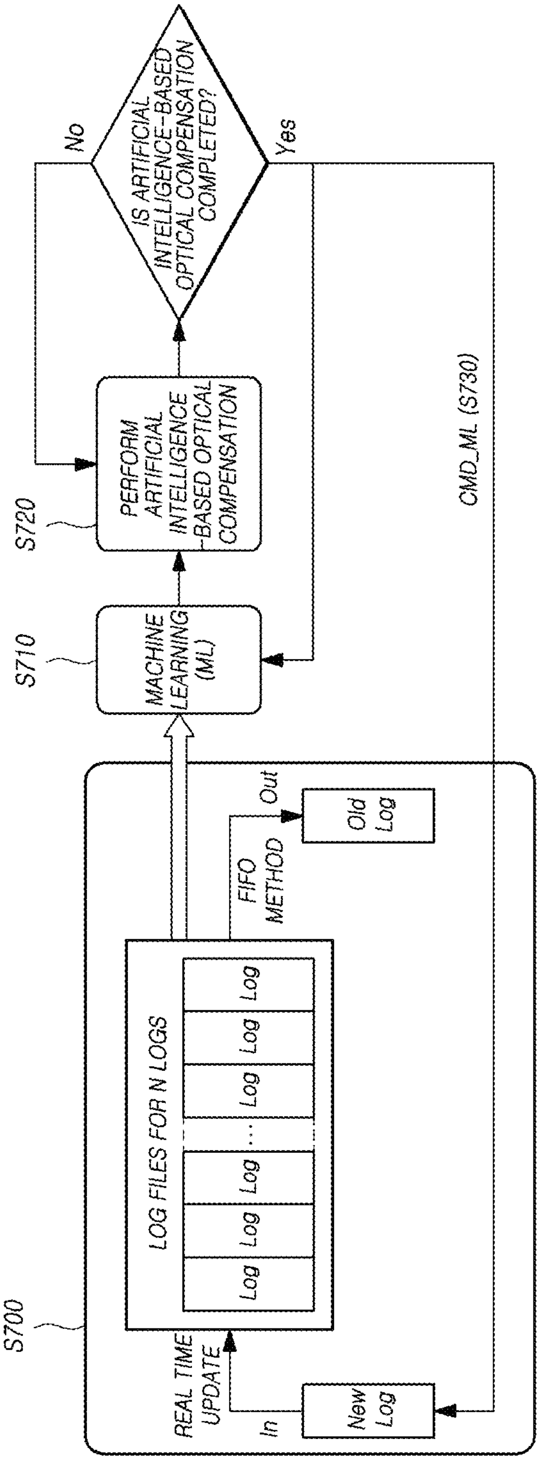
FIG. 7 is a view illustrating machine learning for artificial intelligence-based optical compensation according to embodiments of the present disclosure.

FIG. 7 shows machine learning for artificial intelligence-based optical compensation according to embodiments of the present disclosure.

Referring to FIG. 7, the artificial intelligence-based optical compensation controller 420 of the optical compensation system 400 based on artificial intelligence may store and manage while updating log files for N logs, which is a predetermined number, in real time (S700) and perform machine learning using the log files for N logs (S710). Here, the real-time update, storage, and management of the log file may correspond to operations S530 and S540 in the artificial intelligence-based optical compensation process of FIG. 5. The machine learning may correspond to operation S550 in the artificial intelligence-based optical compensation process of FIG. 5.

Referring to FIG. 7, the artificial intelligence-based optical compensation controller 420 may perform artificial intelligence-based optical compensation for a new display panel using the machine learning result data obtained according to the result of performing machine learning (S720). Here, the artificial intelligence-based optical compensation may correspond to operations S560 and S570 in the artificial intelligence-based optical compensation process of FIG. 5.

Referring to FIG. 7, the artificial intelligence-based optical compensation controller 420 may generate a command CMD_ML to proceed with machine learning (ML) when the artificial intelligence-based optical compensation for the new display panel is completed.

In addition, when the artificial intelligence-based optical compensation for the new display panel is completed, the artificial intelligence-based optical compensation controller 420 may store the artificial intelligence-based optical compensation result data for the new display panel as a new log to update the log file in real time. Accordingly, the artificial intelligence-based optical compensation controller 420 may update and store the optical compensation result data stored as the new log as the previous optical compensation result data and delete the log for the oldest previous optical compensation result data to manage log files for N logs, which is a predetermined number (S700). In this case, for example, the maintenance of the log files for N logs may be performed in a first in first out method.

Referring to FIG. 7, the artificial intelligence-based optical compensation controller 420 may perform machine learning again using the real-time updated log files according to the command CMD_ML to proceed with the machine learning (ML) (S710).

Figure 8:
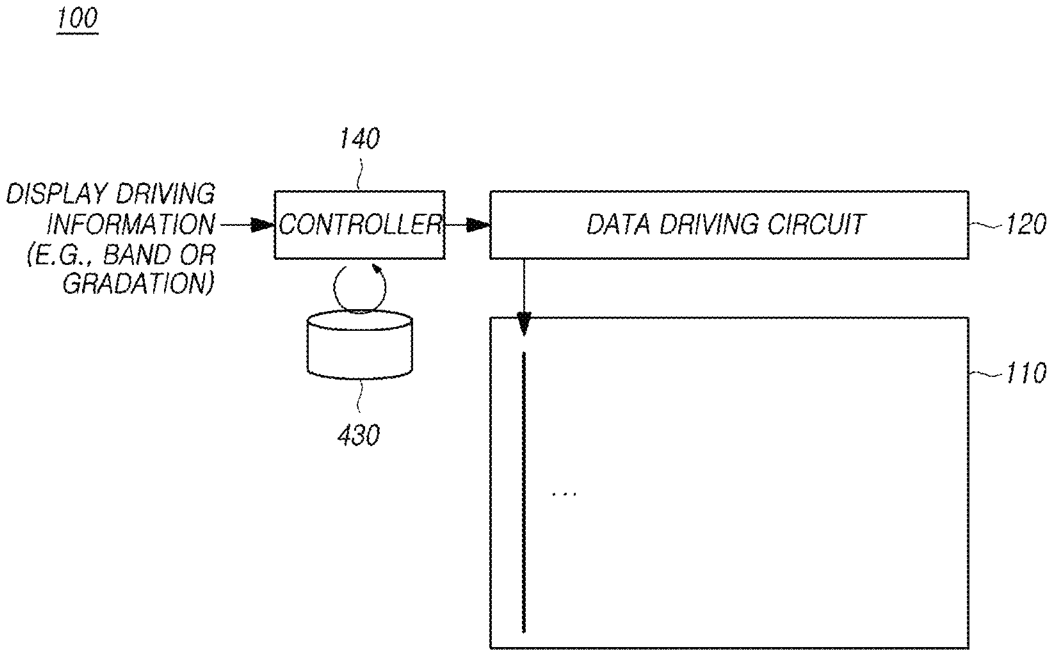
FIG. 8 is a schematic diagram of a display device to which artificial intelligence-based optical compensation according to embodiments of the present disclosure is applied.

FIG. 8 is a schematic diagram of a display device 100 to which artificial intelligence-based optical compensation according to embodiments of the present disclosure is applied.

Referring to FIG. 8, the display device 100 to which artificial intelligence-based optical compensation according to embodiments of the present disclosure is applied may include a display panel 110 including a data line DL, a memory 430 for storing information on data voltages for each band or gradation, and a data driving circuit 120 for outputting a data voltage corresponding to display driving information (e.g., a current band or a current gradation) among the data voltages for each band or gradation stored in the memory 430 to a data line.

A controller 140 may select the data voltage corresponding to the display driving information (e.g., the current band or the current gradation) by referring to the data voltage for each band or gradation stored in the memory 430 and supply data corresponding to the selected data voltage to the data driving circuit 120.

For example, the information on the data voltage for each band or gradation stored in the memory 430 may be information predicted and stored in the memory 430 as the optical compensation result data corresponding to the measurement result data of the optical characteristic of the display panel 110 according to the execution result of the artificial intelligence process based on the artificial intelligence neural network.

For example, the optical compensation result data stored in the memory 430 and predicted according to the artificial intelligence-based optical compensation may include information on a data voltage predicted for each desired target. Here, for example, the desired target may include the desired band, luminance, or color coordinates.

For example, the optical compensation result data stored in the memory 430 and predicted according to the artificial intelligence-based optical compensation may further include information such as a gamma voltage and the like.

The artificial intelligence-based optical compensation according to embodiments of the present disclosure described above is a process that is performed for implementing the same color coordinates and luminance for each object (display panel) in consideration of the optical characteristics of the self-luminous display such as an OLED display.

Since a light emission degree of each of a red sub-pixel, a green sub-pixel, and a blue sub-pixel is different for each object (display panel), the image quality of the self-luminous display such as an OLED display may be greatly improved by applying the artificial intelligence-based optical compensation according to embodiments of the present disclosure.

According to the artificial intelligence-based optical compensation technology according to embodiments of the present disclosure, learning data for machine learning used for optical compensation may be automatically updated in a process line. Accordingly, by immediately performing the optical compensation, it is possible to actively respond to changes in characteristics and conditions of each display panel and to significantly reduce an optical compensation processing time.

The optical compensation system 400 based on artificial intelligence according to embodiments of the present disclosure may use the artificial intelligence neural network such as the affine layer neural network 600. The structure of the affine layer neural network 600 is a structure in which all nodes included in the affine layer neural network 600 are connected to all nodes of a subsequent layer. For example, in a viewpoint of the second intermediate node of the second intermediate layer Lm2, the input nodes of the input layer Lin and the first intermediate nodes of the first intermediate layer Lm1 are all nodes of the previous layers, and the output nodes of the output layer (Lout) are all nodes of the subsequent layer.

In the structure of the affine layer neural network 600, since the nodes of the previous layer are connected to all nodes of the subsequent layer in the optical compensation result, it is possible to predict a result of a current desired point from multiple points.

The optical compensation system 400 based on artificial intelligence according to embodiments of the present disclosure may use results of the previous optical compensation process (previous optical compensation result data) to predict the result of a subsequent optical compensation process (optical compensation result data).

Since the optical compensation system 400 based on artificial intelligence according to embodiments of the present disclosure uses the artificial intelligence neural network such as the affine layer neural network 600 structure, it is possible to predict the result value (optical compensation result data) of the current optical compensation point (e.g., gradation) by using all of the previous optical compensation result data of the previous optical compensation process (e.g., color coordinates, luminance, data voltage Vdata, base voltage EVSS, etc.) for previous samples (other display panels) and all result data of previous optical compensation points (gradations) (e.g., data voltage Vdata, etc.). For example, the optical compensation result data may include a data voltage or the like.

The optical compensation system 400 based on artificial intelligence according to embodiments of the present disclosure may perform a process of learning with big data in advance in order to perform machine learning, and to this end, may automatically update the learning data in real time.

The optical compensation system 400 based on artificial intelligence according to embodiments of the present disclosure may automatically collect log files at each optical compensation completion time to perform machine learning.

A brief description of some of the embodiments of the present disclosure described above is as follows.

Some embodiments of the present disclosure may provide an optical compensation system based on artificial intelligence including a measuring device configured to measure optical characteristics of a display panel, and output measurement result data of the optical characteristics, and an artificial intelligence-based optical compensation controller configured to predict and generate optical compensation result data corresponding to the measurement result data of the optical characteristics based on an artificial intelligence neural network using previous optical compensation result data for at least one other display panel, and store the predicted and generated optical compensation result data in a memory corresponding to the display panel.

The predicted and generated optical compensation result data may include information on a data voltage predicted for each desired target.

The desired target may include the desired band, luminance, or color coordinates.

The predicted and generated optical compensation result data may further include information such as a gamma voltage and the like.

The artificial intelligence neural network may be an affine layer neural network.

The affine layer neural network may include an input layer including a plurality of input nodes corresponding to processing information of a first preprocessing, a first intermediate layer including a plurality of first intermediate nodes corresponding to processing information of a second preprocessing, a second intermediate layer including a plurality of second intermediate nodes corresponding to processing information of a third preprocessing, and an output layer including a plurality of output nodes corresponding to processing information of a main processing.

The plurality of input nodes may be connected to all of the plurality of first intermediate nodes, the plurality of first intermediate nodes may be connected to all of the plurality of second intermediate nodes, and the plurality of second intermediate nodes may be connected to all of the plurality of output nodes.

The first preprocessing may be a pre-optical compensation processing for each color coordinate or luminance, the second preprocessing may be a pre-optical compensation processing for each color using a first luminance value, the third preprocessing may be a pre-optical compensation processing for each color using a second luminance value higher than the first luminance value, and the main processing may be a processing for obtaining the measurement result data of the optical characteristics.

The artificial intelligence-based optical compensation controller may update the artificial intelligence neural network based on the predicted and generated optical compensation result data.

The previous optical compensation result data for the at least one other display panel is data obtained through a result of a previous optical compensation process completed for at least one other display panel, and may include information on a data voltage and a gamma voltage.

The artificial intelligence-based optical compensation controller may generate machine learning result data by performing machine learning using the previous optical compensation result data for at least one other display panel, and may predict and generate the optical compensation result data corresponding to the measurement result data of the optical characteristics based on the artificial neural network using the machine learning result data and the measurement result data of the optical characteristics.

The artificial intelligence-based optical compensation controller may execute a log file collecting process that collects a log file that is big data using the previous optical compensation result data for at least one other display panel, may execute a data processing process that selects learning data for the machine learning from the collected log file, and may generate the machine learning result data by performing the machine learning based on the selected learning data.

The artificial intelligence-based optical compensation controller may perform a preprocessing that sets a driving voltage by controlling so as to primarily measure the optical characteristics of the display panel through the measuring device before measuring the optical characteristics of the display panel for obtaining the measurement result data of the optical characteristics through the measuring device.

The driving voltage may include a base voltage or a black data voltage supplied to sub-pixels included in the display panel, or may include a luminance weight for each region.

Some embodiments of the present disclosure may provide an optical compensation method based on artificial intelligence including operations of measuring optical characteristics of a display panel through a measuring device to generate measurement result data of the optical characteristics, executing an artificial intelligence process based on an artificial intelligence neural network using previous optical compensation result data for at least one other display panel, predicting and generating a data voltage for each band or gradation as optical compensation result data corresponding to the measurement result data of the optical characteristics according to a result of executing the artificial intelligence process, and storing information on the predicted and generated data voltage in a memory corresponding to the display panel.

The optical compensation method based on artificial intelligence according to embodiments of the present disclosure may further include a machine learning progress operation of generating machine learning result data by performing machine learning using the previous optical compensation result data for at least one other display panel before the operation of executing the artificial intelligence process.

In the operation of executing the artificial intelligence process, the optical compensation result data corresponding to the measurement result data of the optical characteristics may be predicted and generated based on the machine learning result data and the measurement result data of the optical characteristics.

The optical compensation method based on artificial intelligence according to embodiments of the present disclosure may further include a log file collecting operation of collecting a log file that is big data using the previous optical compensation result data for at least one other display panel before the machine learning progress operation, and a data processing operation of selecting learning data for the machine learning from the collected log file.

The optical compensation method based on artificial intelligence according to embodiments of the present disclosure may further include a preprocessing operation of setting a driving voltage by controlling so as to primarily measure the optical characteristics of the display panel through the measuring device before the operation of generating the measurement result data of the optical characteristics.

The optical compensation method based on artificial intelligence according to embodiments of the present disclosure may further include a loop controlling operation of changing a band and a point after the operation of predicting and generating the data voltage.

After the loop controlling operation, the operation of generating the measurement result data of the optical characteristics, the operation of executing the artificial intelligence process, and the operation of predicting and generating the data voltage may be repeatedly executed.

The embodiments of the present disclosure may provide a display device including a display panel including a data line, a memory storing information on data voltages for each band or gradation, and a data driving circuit outputting a data voltage corresponding to a current band or a current gradation among the data voltages for each band or gradation to the data line.

In the display device according to the embodiments of the present disclosure, the information on the data voltage for each band or gradation stored in the memory may be information predicted and generated as optical compensation result data corresponding to measurement result data of optical characteristics of the display panel according to a result of executing an artificial intelligence process based on an artificial intelligence neural network, and stored in the memory.

In the display device according to the embodiments of the present disclosure, the predicted and generated optical compensation result data may include information on a data voltage predicted for each desired target.

In the display device according to the embodiments of the present disclosure, the desired target may include the desired band, luminance, or color coordinates, and the predicted and generated optical compensation result data may further include information such as a gamma voltage and the like.

According to the above-described embodiments of the present disclosure, it is possible to provide an optical compensation system, an optical compensation method, and a display device based on artificial intelligence as accurate and fast optical compensation technology.

According to the embodiments of the present disclosure, it is possible to provide an optical compensation system, an optical compensation method, and a display device based on artificial intelligence that can also perform display driving by predicting a data voltage optimized for optical characteristics of a display panel.

According to the embodiments of the present disclosure, it is possible to provide an optical compensation system and an optical compensation method based on artificial intelligence capable of actively and quickly responding to characteristic and condition changes of each display panel, and a display device to which artificial intelligence-based optical compensation is applied.

The above description provide an example of the technical idea of the present disclosure for illustrative purposes only. Various modifications and changes will be possible without departing from the essential features of the present disclosure by those skilled in the art to which the present disclosure pertains. In addition, the embodiments disclosed in the present disclosure are intended to illustrate the scope of the technical idea of the present disclosure, and the scope of the present disclosure is not limited by the embodiments. The protection scope of the present disclosure should be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical compensation system, comprising:

a measuring device configured to measure optical characteristics of a display panel and output measurement result data of the optical characteristics; and an artificial intelligence-based optical compensation controller configured to predict and generate optical compensation result data corresponding to the measurement result data of the optical characteristics based on an artificial intelligence neural network using previous optical compensation result data for at least one other display panel, the artificial intelligence-based optical compensation controller configured to store the predicted and generated optical compensation result data in a memory corresponding to the display panel, wherein the artificial intelligence neural network is an affine layer neural network, wherein the affine layer neural network includes an input layer including a plurality of input nodes corresponding to processing information of a first preprocessing, a first intermediate layer including a plurality of first intermediate nodes corresponding to processing information of a second preprocessing, a second intermediate layer including a plurality of second intermediate nodes corresponding to processing information of a third preprocessing, and an output layer including a plurality of output nodes corresponding to processing information of a main processing, wherein the first preprocessing is a pre-optical compensation processing for each color coordinate or luminance, the second preprocessing is a pre-optical compensation processing for each color using a first luminance value, the third preprocessing is a pre-optical compensation processing for each color using a second luminance value higher than the first luminance value, and the main processing is a processing for obtaining the measurement result data of the optical characteristics.

2. The optical compensation system of claim 1, wherein the predicted and generated optical compensation result data includes information on data voltages predicted for each band, luminance, or color coordinate.

3. The optical compensation system of claim 2, wherein the predicted and generated optical compensation result data further includes information on a gamma voltage.

4. The optical compensation system of claim 1, the plurality of input nodes is connected to all of the plurality of first intermediate nodes, the plurality of first intermediate nodes is connected to all of the plurality of second intermediate nodes, and the plurality of second intermediate nodes are connected to all of the plurality of output nodes.

5. The optical compensation system of claim 1, wherein the artificial intelligence-based optical compensation controller updates the artificial intelligence neural network based on the predicted and generated optical compensation result data.

6. The optical compensation system of claim 1, wherein the previous optical compensation result data for the at least one other display panel is data obtained through a result of a previous optical compensation process completed for the at least one other display panel, and includes information on a data voltage.

7. The optical compensation system of claim 1, wherein the artificial intelligence-based optical compensation controller is configured to:

generate machine learning result data by performing machine learning using the previous optical compensation result data for the at least one other display panel, and predict and generate the optical compensation result data corresponding to the measurement result data of the optical characteristics based on the artificial neural network using the machine learning result data and the measurement result data of the optical characteristics.

8. The optical compensation system of claim 7, wherein the artificial intelligence-based optical compensation controller is configured to:

execute a log file collecting process that collects a log file that is big data using the previous optical compensation result data for the at least one other display panel, execute a data processing process that selects learning data for the machine learning from the collected log file, and generate the machine learning result data by performing the machine learning based on the selected learning data.

9. The optical compensation system of claim 1, wherein the artificial intelligence-based optical compensation controller is configured to:

perform a preprocessing that sets a driving voltage by controlling so as to primarily measure the optical characteristics of the display panel through the measuring device before measuring the optical characteristics of the display panel for obtaining the measurement result data of the optical characteristics through the measuring device.

10. The optical compensation system of claim 9, wherein the driving voltage includes a base voltage or a black data voltage supplied to sub-pixels included in the display panel, or includes a luminance weight for each region.

11. An optical compensation method, comprising:

measuring optical characteristics of a display panel through a measuring device and generating measurement result data of the optical characteristics;

executing an artificial intelligence process based on an artificial intelligence neural network using previous optical compensation result data for at least one other display panel;

predicting and generating a data voltage for each band or gradation as optical compensation result data corresponding to the measurement result data of the optical characteristics according to a result of executing the artificial intelligence process; and storing information on the predicted and generated data voltage in a memory corresponding to the display panel, further comprising a loop controlling operation of changing a band and a point after the operation of predicting and generating the data voltage, wherein after the loop controlling operation, the operation of generating the measurement result data of the optical characteristics, the operation of executing the artificial intelligence process, and the operation of predicting and generating the data voltage are repeatedly executed.

12. The optical compensation method of claim 11, further comprising a machine learning progress operation of generating machine learning result data by performing machine learning using the previous optical compensation result data for the at least one other display panel before the operation of executing the artificial intelligence process, wherein in the operation of executing the artificial intelligence process, the optical compensation result data corresponding to the measurement result data of the optical characteristics is predicted and generated based on the machine learning result data and the measurement result data of the optical characteristics.

13. The optical compensation method of claim 12, further comprising: before the machine learning progress operation, a log file collecting operation of collecting a log file that is big data using the previous optical compensation result data for the at least one other display panel; and a data processing operation of selecting learning data for the machine learning from the collected log file.

14. The optical compensation method of claim 11, further comprising a preprocessing operation of setting a driving voltage by controlling so as to primarily measure the optical characteristics of the display panel through the measuring device before the operation of generating the measurement result data of the optical characteristics.

15. A display device, comprising:

a display panel including a data line;

a memory configured to store information on a data voltage for each band or gradation; and a data driving circuit configured to output a data voltage corresponding to a current band or a current gradation among the data voltages for each band or gradation to the data line, wherein the information on the data voltage for each band or gradation stored in the memory is information predicted and generated as optical compensation result data corresponding to measurement result data of optical characteristics of the display panel according to a result of executing an artificial intelligence process based on an artificial intelligence neural network, wherein the artificial intelligence neural network is an affine layer neural network, wherein the affine layer neural network includes an input layer including a plurality of input nodes corresponding to processing information of a first preprocessing, a first intermediate layer including a plurality of first intermediate nodes corresponding to processing information of a second preprocessing, a second intermediate layer including a plurality of second intermediate nodes corresponding to processing information of a third preprocessing, and an output layer including a plurality of output nodes corresponding to processing information of a main processing, wherein the first preprocessing is a pre-optical compensation processing for each color coordinate or luminance, the second preprocessing is a pre-optical compensation processing for each color using a first luminance value, the third preprocessing is a pre-optical compensation processing for each color using a second luminance value higher than the first luminance value, and the main processing is a processing for obtaining the measurement result data of the optical characteristics.

16. The display device of claim 15, wherein the predicted and generated optical compensation result data includes information on a data voltage predicted for each desired target.

17. The display device of claim 16, wherein the desired target includes a desired band, luminance, or color coordinate, and the predicted and generated optical compensation result data further includes information on a gamma voltage.

* * * * *